US012663276B2

(12) United States Patent
Jeong et al.

(10) Patent No.: US 12,663,276 B2
(45) Date of Patent: Jun. 23, 2026

(54) APPARATUS FOR LEARNING ENERGY EFFICIENCY, A SYSTEM HAVING THE SAME, AND A METHOD THEREOF

(71) Applicants:HYUNDAI MOTOR COMPANY, Seoul (KR); KIA CORPORATION, Seoul (KR)

(72) Inventors: Dong Hoon Jeong, Seongnam-si (KR); Jung Hwan Bang, Seoul (KR); Hyung Seuk Ohn, Seoul (KR); Won Seok Jeon, Anyang-si (KR); Ki Sang Kim, Seoul (KR); Byeong Wook Jeon, Seoul (KR); Dong Hoon Won, Suwon-si (KR); Hee Yeon Nah, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 330 days.

(21) Appl. No.: 18/217,646

(22) Filed: Jul. 3, 2023

(65) Prior Publication Data

US 2024/0200959 A1 Jun. 20, 2024

(30) Foreign Application Priority Data

Dec. 14, 2022 (KR) ........................ 10-2022-0175184

(51) Int. Cl.
*G01C 21/34* (2006.01)
*B60W 40/105* (2012.01)
(52) U.S. Cl.
CPC ....... *G01C 21/3469* (2013.01); *B60W 40/105* (2013.01); *B60W 2510/083* (2013.01)

(58) Field of Classification Search
None
See application file for complete search history.

(56) References Cited

U.S. PATENT DOCUMENTS 8,744,656 B2 6/2014 Sato et al.
9,139,095 B2 9/2015 Kim
(Continued)

FOREIGN PATENT DOCUMENTS

CN 104973057 A 10/2015
CN 108556838 A 9/2018
(Continued)

OTHER PUBLICATIONS

Qi, Xuewei, et al., "Deep reinforcement learning enabled self-learning control for energy efficient driving," 2019, Elsevier, Transportation Research Part C 99 (2019), pp. 67-81 (Year: 2019).*
(Continued)

*Primary Examiner* — Madison R. Inserra
(74) *Attorney, Agent, or Firm* — Lempia Summerfield Katz LLC

(57) ABSTRACT

An energy efficiency improvement learning apparatus includes a processor configured to perform learning for vehicle control to minimize vehicle energy consumption required for vehicle driving under random conditions based on a reinforcement learning algorithm, and provide learned parameters of the reinforcement learning algorithm to a vehicle. The energy efficiency improvement learning apparatus also includes a storage medium configured to store data and algorithms, and the reinforcement learning algorithm executable by the processor.

19 Claims, 15 Drawing Sheets

(56) References Cited

U.S. PATENT DOCUMENTS

| | | |
|---|---|---|
| 11,407,316 B2 | 8/2022 | Ito |
| 2012/0123624 A1 | 5/2012 | Sato et al. |
| 2013/0253740 A1 | 9/2013 | Kim |
| 2018/0273018 A1 | 9/2018 | Follen et al. |
| 2019/0276002 A1 | 9/2019 | Ito |
| 2023/0138908 A1 | 5/2023 | Woo |
| 2023/0192085 A1 | 6/2023 | Woo |
| 2023/0234596 A1 | 7/2023 | Woo |

FOREIGN PATENT DOCUMENTS

| | | |
|---|---|---|
| JP | 2008164341 A | 7/2008 |
| JP | 2012110089 A | 6/2012 |
| JP | 6081723 B2 | 1/2017 |
| JP | 2018083574 A | 5/2018 |
| KR | 20230060812 A | 5/2023 |
| KR | 20230092060 A | 6/2023 |
| KR | 20230114798 A | 8/2023 |

OTHER PUBLICATIONS

Zhu, Meixin, et al., "Safe, efficient, and comfortable velocity control based on reinforcement learning for autonomous driving," 2020, Elsevier, Transportation Research Part C 117 (2020) 102662, pp. 1-14 (Year: 2020).*

Lee, Heeyun, et al., "Model-Based Reinforcement Learning for Eco-Driving Control of Electric Vehicles," Nov. 9, 2020, IEEE Access, vol. 8, pp. 202886-202896 (Year: 2020).*

Hu, Jincheng et al., "Progress and summary of reinforcement learning on energy management of MPS-EV," 2012, Elsevier, Procedia Economics and Finance 00 (2012), pp. 1-42 (Year: 2012).*

* cited by examiner $$factor_{distance} = \left(\frac{distance_{actual}}{distance_{target}}\right)^2$$

$$factor_{distance} = \left(2 - \frac{distance_{actual}}{distance_{target}}\right)^2$$

⟨601⟩

⟨602⟩

Vehicle speed
change range:
+/- 10KPH

⟨1001⟩

Torque

Driving time = 85.8sec          — ·—Rear wheel torque
Consumed energy = 100.8Wh       -----Front wheel torque
                                ———Altitude

⟨1002⟩

Driving time = 86.5sec          — ·—Rear wheel torque
Consumed energy = 126.1Wh       -----Front wheel torque
                                ———Altitude

1

APPARATUS FOR LEARNING ENERGY EFFICIENCY, A SYSTEM HAVING THE SAME, AND A METHOD THEREOF

CROSS-REFERENCE TO RELATED APPLICATION

This application claims priority to and the benefit of Korean Patent Application No. 10-2022-0175184, filed on Dec. 14, 2022, the entire contents of which are incorporated herein by reference.

TECHNICAL FIELD

The present disclosure relates to an energy efficiency improvement learning apparatus, a vehicle energy efficiency improvement system having the same, and a method thereof, and more particularly, to a technique capable of improving electrical energy efficiency based on a reinforcement learning model.

BACKGROUND

If an electric vehicle drives a path from a starting point to a destination, it is necessary to minimize electrical energy consumption.

Conventionally, a method of minimizing electrical energy through a prediction-based optimization method or the like has been developed.

This conventional method divides a road slope within a predicted range (e.g., from the current point to 1200 m ahead) into a plurality of steps (e.g., 60 equally divided at intervals of 20 m), and performs repeated calculation until an optimal speed of 60 sections converges by converting an optimal speed value of each step section using quadratic programming, etc.

In addition, if one of parameters of a physical equation, such as driving resistance or vehicle weight, changes, a large deviation occurs in the control result, and thus additional calculation such as a parameter estimation technique using a recursive least square directional forgetting algorithm is required.

It is difficult to install such a complicated calculation technique in a mass-produced vehicle equipped with a vehicle controller with low calculation performance, and there is a problem in that a calculation device with high calculation performance is additionally installed.

The above information disclosed in this Background section is provided only for enhancement of understanding of the background of the present disclosure, and therefore, it may contain information that does not form prior art that is already known to those having ordinary skill in the art.

SUMMARY

Embodiments of the present disclosure provide an energy efficiency improvement learning apparatus, a system including the same, and a method thereof, capable of reflecting parameters of a learned learning algorithm to a learning algorithm installed in a vehicle by pre-learning conditions to minimize electrical energy usage based on a reinforcement learning model at a workstation outside the vehicle, and improving electrical energy efficiency of the vehicle by controlling the vehicle by outputting an action strategy that can use an optimal energy in real time while driving the vehicle.

Embodiments of the present disclosure provide an energy efficiency improvement learning apparatus, a vehicle energy efficiency improvement system including the same, and a method thereof, capable of improving electrical energy efficiency of the vehicle by learning a motor control strategy for driving that minimizes electrical energy usage based on random driving conditions using a workstation with powerful computational performance outside the vehicle as a policy network of deep reinforcement learning, and controlling the vehicle using a learning result thereof.

The technical objects of the present disclosure are not limited to the technical objects mentioned above, and other technical objects, that are not mentioned above, can be clearly understood by those having ordinary skill in the art from the following description.

According to an embodiment of the present disclosure, an energy efficiency improvement learning apparatus includes a processor configured to perform learning for vehicle control to minimize vehicle energy consumption required for vehicle driving under random conditions based on a reinforcement learning algorithm, and provide learned parameters of the reinforcement learning algorithm to a vehicle. The energy efficiency improvement learning apparatus also includes a storage medium configured to store data and algorithms, wherein the storage medium stores the reinforcement learning algorithm executable by the processor.

In an aspect, the processor may be configured to randomly generate an entire path from a starting point to a destination, a road shape, a target driving time, an initial vehicle speed, an average target speed, an upper speed limit, a lower speed limit, or any combination thereof. The processor may be configured to start a reinforcement learning episode including a process of a state, an action, and a reward from an initial state to an end state.

In an embodiment of the present disclosure, the action may include motor demand torque.

In an embodiment of the present disclosure, the reward may include at least one of energy efficiency, a driving time, a speed range, or any combination thereof.

In an embodiment of the present disclosure, the processor may be configured to: perform a first action according to a first state, determine a first reward according to the first action, and transition to a second state when the reinforcement learning algorithm is executed.

In an embodiment of the present disclosure, the storage medium is configured to store the first state, the first action, the first reward, and the second state as first data.

In an embodiment of the present disclosure, the processor may be configured to learn a policy function for determining what action to take by using at least one piece of data storing a state, an action, a reward, and a new state.

In an embodiment of the present disclosure, the processor may be configured to determine a reward based on a predetermined speed constraint condition, a predetermined time constraint condition, and energy required for driving.

In an embodiment of the present disclosure, the processor may be configured to, after starting the reinforcement learning episode under the random condition, compare a driving time during a predetermined learning period with a predetermined time constraint condition.

In an embodiment of the present disclosure, the processor may be configured to, if the driving time during the predetermined learning period is greater than predetermined time constraint period: end the reinforcement learning episode, and calculate a reward based on a vehicle speed if the driving time during the predetermined learning period is smaller than the predetermined time constraint condition.

In an embodiment of the present disclosure, the processor may be configured to determine the reward based on the vehicle speed as a predetermined negative reward if the vehicle speed is lower than a predetermined lower limit or higher than a predetermined upper limit.

In an embodiment of the present disclosure, the processor may be configured to, if the vehicle speed is lower than a predetermined lower limit for ending learning or is higher than a predetermined upper limit for ending learning: determine the reward based on the vehicle speed as a predetermined maximum negative reward, and to end the reinforcement learning episode.

In an embodiment of the present disclosure, the processor may be configured to, after ending the reinforcement learning episode, determine a final reward by calculating a reward based on a time and summing the reward based on the vehicle speed and the reward based on the time.

In an embodiment of the present disclosure, the processor may be configured to, if the vehicle speed is a value between a predetermined lower limit speed for ending learning and a predetermined upper limit speed for ending learning, determine a weight reward using a predetermined weight and required motor power.

In an embodiment of the present disclosure, the processor may be configured to determine whether a driving distance during the predetermined learning period is smaller than a predetermined target driving distance. The processor may further be configured to, if the driving distance during the predetermined learning period is smaller than the predetermined target driving distance, determine a final reward by summing the reward based on the vehicle speed and the weight reward.

In an embodiment of the present disclosure, the processor may be configured to determine whether the driving distance during the predetermined learning period is smaller than a predetermined target driving distance. The processor may further be configured to, if the driving distance during the predetermined learning period is equal to or greater than the predetermined target driving distance: end the reinforcement learning episode and calculate the time-based reward, and sum the vehicle speed-based reward, the time-based reward, and the weight reward to determine a final reward.

In an embodiment of the present disclosure, the processor may be configured to calculate the time-based reward by using a maximum time constraint reward value, a time factor, and a distance factor.

In an embodiment of the present disclosure, the processor may be configured to: linearly assign a weight to a ratio of a target time to an actual driving time, and exponentially assign a weight to the ratio of the target distance to the actual driving distance.

In an embodiment of the present disclosure, the energy efficiency improvement learning apparatus may further include a vehicle control apparatus configured to determine a vehicle control command by inputting vehicle state information to the reinforcement learning algorithm to which learned parameters received from the energy efficiency improvement learning apparatus are applied.

According to another embodiment of the present disclosure, an energy efficiency improvement system includes an energy efficiency improvement learning apparatus configured to: perform learning for vehicle control to minimize vehicle energy consumption required for vehicle driving under random conditions based on a reinforcement learning algorithm, and provide learned parameters of the reinforcement learning algorithm to a vehicle. The energy efficiency improvement system also includes a vehicle control apparatus configured to determine a vehicle control command by inputting vehicle state information to the reinforcement learning algorithm to which learned parameters received from the energy efficiency improvement learning apparatus are applied.

According to yet another embodiment of the present disclosure, an electrical energy efficiency improvement method for a vehicle includes performing, by a processor, learning for vehicle control to minimize vehicle energy consumption required for vehicle driving under random conditions based on a reinforcement learning algorithm. The method also includes providing, by the processor, learned parameters of the reinforcement learning algorithm to a vehicle.

According to the present technique, it may be possible to reflect parameters of a learned learning algorithm to a learning algorithm installed in a vehicle by pre-learning conditions to minimize electrical energy usage based on a reinforcement learning model at a workstation outside the vehicle, and improving electrical energy efficiency of the vehicle by controlling the vehicle by outputting an action strategy that can use an optimal energy in real time while driving the vehicle.

In addition, according to the present technique, it may be possible to improve electrical energy efficiency of the vehicle by learning a motor control strategy for driving that minimizes electrical energy usage based on random driving conditions through a workstation with powerful computational performance outside the vehicle as a policy network of deep reinforcement learning, and controlling the vehicle using a learning result thereof.

In addition, according to the present technique, even if an initial condition, a road environment, or a vehicle weight change, there may be almost no performance degradation by learning a motor control strategy for driving that minimizes electrical energy usage in randomly given roads and driving conditions.

In addition, according to the present technique, the vehicle control apparatus with low computational performance may learn the driving strategy with a neural network size (parameters=3073) that can be inferred within a control period (e.g., 10 ms), and thus electrical energy efficiency may be increased without incurring additional costs.

Furthermore, various effects that can be directly or indirectly identified through this document may be provided.

DETAILED DESCRIPTION

Figure 1:
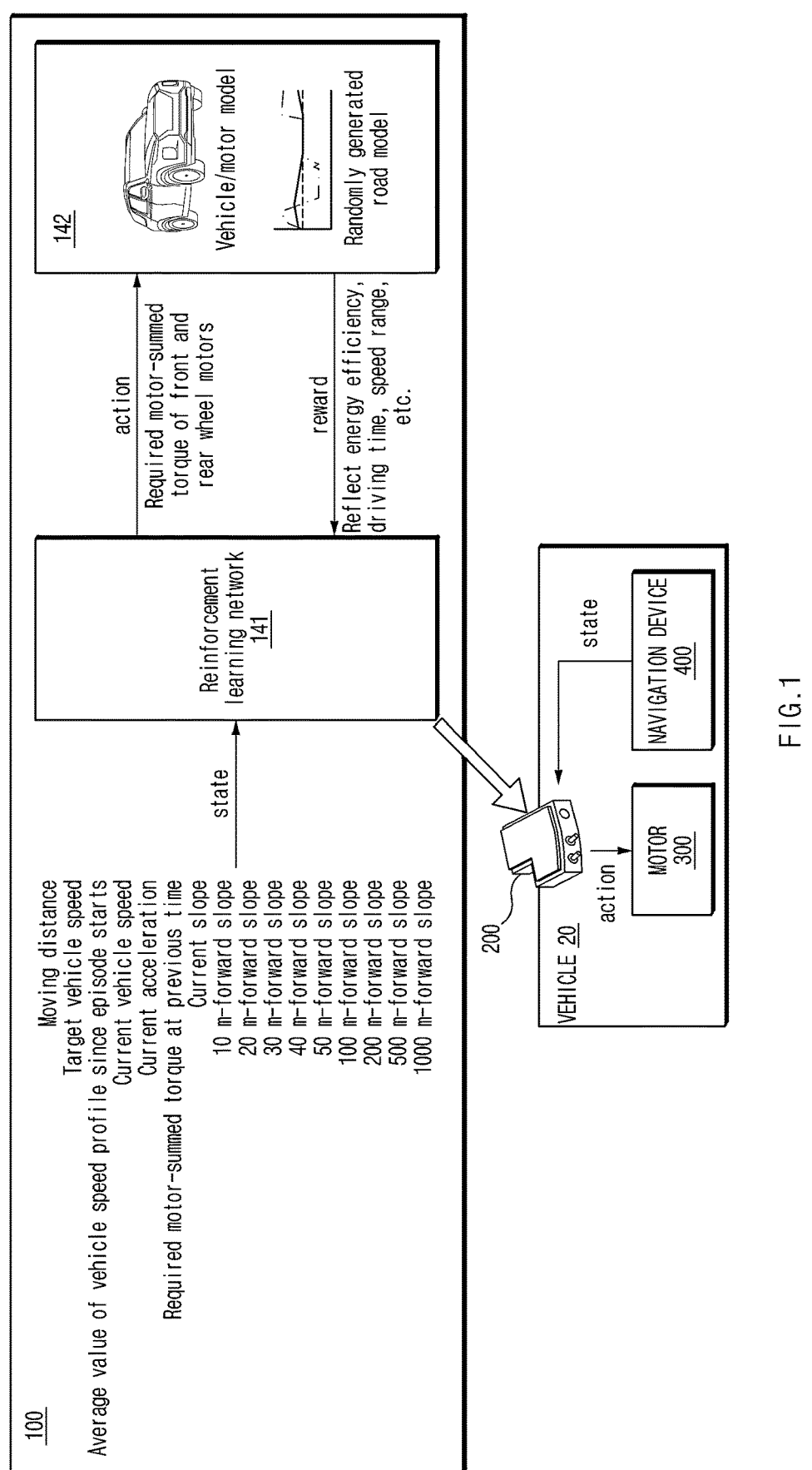
FIG. 1 illustrates a block diagram showing a configuration of a vehicle energy efficiency improvement system, according to an embodiment of the present disclosure.

Hereinafter, some embodiments of the present disclosure are described in detail with reference to accompanying drawings. In the accompanying drawings, same reference numerals designate same elements even when the elements are shown on different drawings. Furthermore, in the following description, when it is determined that detailed descriptions of related well-known configurations, functions, or components may interfere with understanding of the embodiments of the present disclosure, the detailed descriptions thereof are omitted.

In describing constituent elements according to embodiments of the present disclosure, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those having ordinary skill in the art to which the present disclosure pertains, unless the terms are differently defined herein. Terms defined in a generally used dictionary should be construed to have meanings matching those in the context of a related art, and should not be construed to have idealized or excessively formal meanings unless they are clearly defined in the present specification.

When a component, device, element, or the like of the present disclosure is described as having a purpose or performing an operation, function, or the like, the component, device, or element should be considered herein as being "configured to." meet that purpose or perform that operation or function.

Hereinafter, various embodiments of the present disclosure are described in detail with reference to FIG. 1-FIG. 15.

Figure 2:
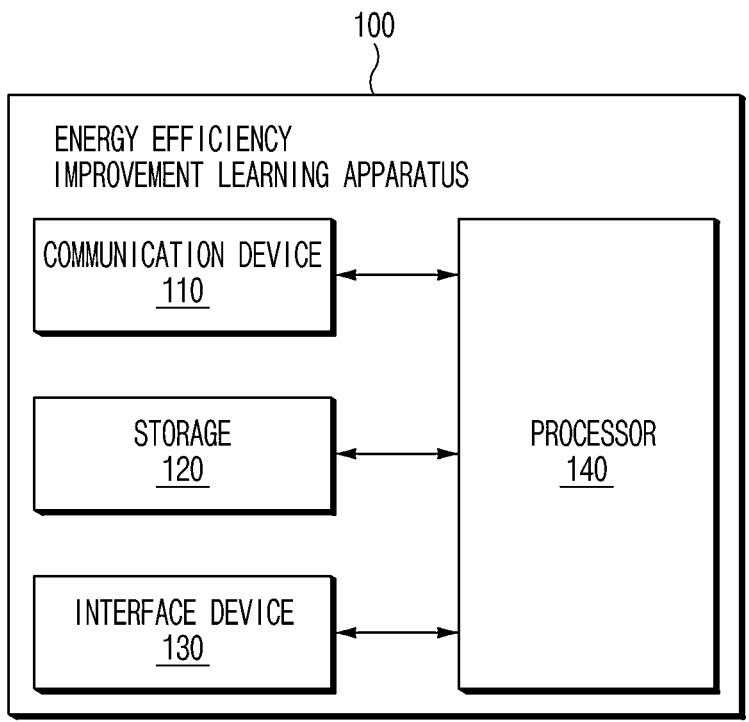
FIG. 2 illustrates a detailed schematic diagram of an energy efficiency improvement learning apparatus, according to an embodiment of the present disclosure.
Figure 3:
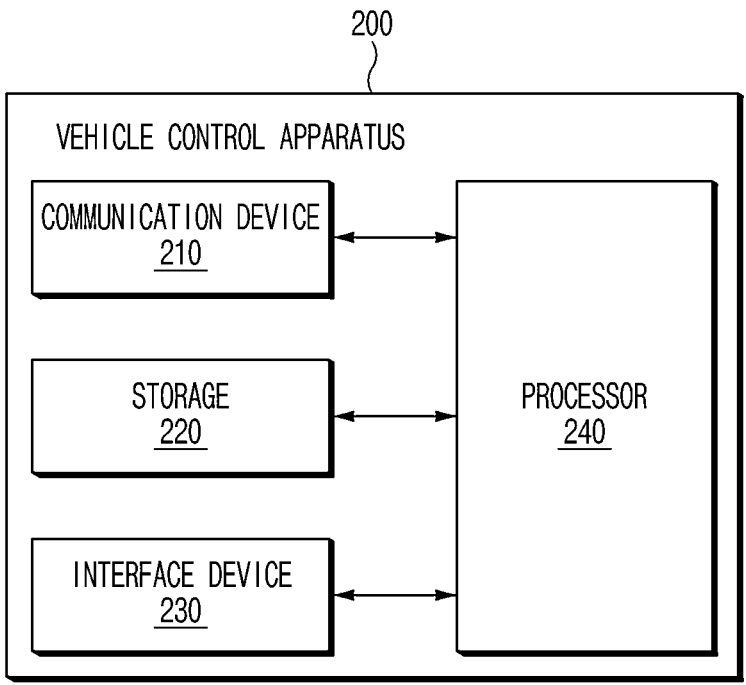
FIG. 3 illustrates a detailed schematic diagram of a vehicle control apparatus, according to an embodiment of the present disclosure.

FIG. 1 illustrates a block diagram showing a configuration of a vehicle energy efficiency improvement system, according to an embodiment. FIG. 2 illustrates a detailed schematic diagram of an energy efficiency improvement learning apparatus, according to an embodiment. FIG. 3 illustrates a detailed schematic diagram of a vehicle control apparatus, according to an embodiment.

Referring to FIG. 1, a vehicle energy efficiency improvement system according to an embodiment of the present disclosure may include an energy efficiency improvement learning apparatus 100 and a vehicle control apparatus 200.

A reinforcement learning model may be installed in both the energy efficiency improvement learning apparatus 100 and the vehicle control apparatus 200, and the reinforcement learning model is described accordingly below.

Reinforcement learning may be a type of machine learning, and may belong to a field that allows self-learning by repeatedly determining whether an action is good or bad and giving a reward (or penalty), if the action is performed in a certain environment. Such reinforcement learning may indicate an artificial intelligence technique that learns behavioral strategies that maximize cumulative reward that can be obtained from an environment through an interaction in which an agent takes action according to the environment and a state of the environment, and the state of the environment changes accordingly.

In an embodiment, the agent, which is a subject that determines what action to take according to a state observed in the environment, may acquire observation data from the environment. The agent may determine and perform an action based on a policy with observation data, and may receive a reward for the action performed. In an embodiment of the present disclosure, a reinforcement learning network 141 of the energy efficiency improvement learning apparatus 100 may serve as an agent.

The environment may provide a change according to a result of the action of the agent as observation data. The environment may correspond to a simulator 142, in an embodiment. The environment may include three elements: a state, a transition probability, and a reward. In an embodiment, an action may be to change the state of the environment, and a state may be one value of a set of all possible values of an observable variable. The transition probability may be as shown in Equation 1 below, and may indicate a probability of changing to one value $s_{t+1}$ of a set of states when an action is applied to an environment of a certain state $s_t$.

$$P_t(s_{t+1}|s_t, a_t) \qquad \text{Equation 1}$$

As shown in Equation 1, the transition probability $p_t$ may indicate a probability of changing from the state $s_t$ to a next state $s_{t+1}$ when an action $a_t$ is applied to the environment.

The policy may also be a strategy for taking an action on a given state. The policy may be expressed as $\pi$.

The reward may be a reward for an action. A cumulative reward may indicate a sum of the rewards received at every moment from the past to the present. The cumulative reward may be expressed as in Equation 2 below.

$$U(\lfloor s_0, s_1, s_2, ...\rfloor) = \sum\nolimits_{t=0}^{\infty} r^t R(s_t) \le \sum\nolimits_{t=0}^{\infty} r^t R_{max} = \frac{R_{max}}{1-\gamma} \qquad \text{Equation 2}$$

A cumulative reward U for states $s_0$, $s_1$, . . . may indicate a value at which a reward value of the state $s_t$ over time is smaller than or equal to a maximum reward value $\gamma R_{max}$.

$\gamma$ may be a depreciation rate, which is a concept for convergence of cumulative reward, and may be set to a value greater than 0 and smaller than 1, causing an effect of giving weight to current reward.

Optimal policy π* may be a strategy that maximizes an expected value of the cumulative reward that occurs if the policy is followed. Optimal policy may be expressed as Equation 3 below.

$$\pi^* = \mathrm{argmax}\ U^\pi(s),\ U^\pi(s) = IE\left[\sum\nolimits_{t=0}^{\infty} r^t R(s_t)\right] \qquad \text{Equation 3}$$

The energy efficiency improvement learning apparatus 100 may be implemented outside a vehicle 20. A reinforcement learning model may be installed on a workstation. An agent may take an action according to the environment and a state of the environment based on the reinforcement learning model, and thus it may learn a behavioral strategy that maximizes the cumulative reward obtained from the environment through interactions with changes in the state of the environment. The agent may provide learned parameters of the learned reinforcement learning model to the vehicle 20. In an embodiment, if the reinforcement learning model is learned, after going through a process of action and reward, differential calculation may be performed to check it, which may require a very large amount of calculations, in at least some embodiments. Accordingly, the energy efficiency improvement learning apparatus 100 may be installed on a high-performance workstation.

A reinforcement learning model in which parameters learned by the energy efficiency improvement learning apparatus 100 are reflected may be installed in the vehicle control apparatus 200 of the vehicle 20. While the vehicle 20 is driving, real-time state information may be used as an input to perform vehicle control for optimal reward (e.g., energy efficiency, a driving time, a speed range, etc.). Accordingly, the energy efficiency improving learning apparatus 100 may perform calculations using a high-performance workstation for learning parameters of the reinforcement learning model, and the vehicle control device 200 of the vehicle 20 may use the parameters learned in the energy efficiency improvement learning apparatus 100 without having to learn the parameters of the reinforcement learning model, thereby improving optimal energy efficiency while minimizing a computational burden.

The energy efficiency improvement learning apparatus 100 may include a reinforcement learning network 141 and a simulator 142.

The reinforcement learning network 141 may learn a moving distance, a target vehicle speed, an average value of vehicle speed profile since an episode starts, a current vehicle speed, current acceleration, required motor-summed torque at a previous time, a current slope, a state of the forward slope by distance (e.g., a 10 km-forward slope, a 20 km-forward slope, etc.), and the like, to output required motor-summed torque of front and rear wheel motors as an action on a condition.

Accordingly, the simulator 142 may simulate a vehicle model using the required motor-summed torque of the front and rear wheel motors received from the reinforcement learning network 141, and as a result, may feedback fuel economy, a driving time, a speed range, etc. to the reinforcement learning network 141 as a reward.

The vehicle control apparatus 200 may control the vehicle by learning driving strategy based on current driving information on a basis of a learning result thereof (learned parameters of the reinforcement learning model) received from the energy economy improvement learning apparatus 100, thereby improving electrical energy efficiency of the vehicle. The vehicle control apparatus 200 may not have higher calculation performance than that of the energy efficiency improvement learning apparatus 100. The driving strategy may be learned with a neural network size (parameters=3073) capable of inference within a control period (e.g., 10 ms) of the vehicle control apparatus 200, for example.

The vehicle control apparatus 200 may receive state-related information from a navigation device 400, and may drive it as an input of the reinforcement learning network to output required torque or the like to a motor 300 as an action.

The vehicle control apparatus 200 may be implemented inside the vehicle or separately therefrom. For example, the vehicle control apparatus 200 may be integrally formed with internal control units of the vehicle, or may be implemented as a separate hardware device to be connected to control units of the vehicle by a connection means. In various embodiments, the vehicle control apparatus 200 may be implemented integrally with the vehicle, may be implemented in a form that is installed or attached to the vehicle as a configuration separate from the vehicle, or a part of the vehicle control apparatus 200 may be implemented integrally with the vehicle, and another part of the vehicle control apparatus 200 may be implemented in a form that is installed or attached to the vehicle as a configuration separate from the vehicle.

Referring to FIG. 2, the energy efficiency improvement learning apparatus 100 may include a communication device 110, a storage 120, an interface device 130, and a processor 140.

The communication device 110 may be a hardware device implemented with various electronic circuits to transmit and receive signals through a wireless or wired connection. The communication device 110 may transmit information to and/or receive information from devices in the energy efficiency improvement learning apparatus 100 based on a network communication technique, such as a wired or a wireless network communication technique. The communication device 110 may also perform communication with the external vehicle 20 based on a wired or wireless network communication technique, such as wired or wireless Internet access. The network communication technique may include wireless LAN (WLAN), wireless broadband (Wibro), WI-FI, world Interoperability for microwave access (WIMAX), etc.

As an example, the communication device 110 may transmit a learning result to the vehicle control apparatus 200.

The storage 120 may store data and/or algorithms required for the processor 140 to operate, and the like. As an example, the storage 120 may store a reinforcement learning algorithm and a state, action, reward, etc. through learning of the reinforcement learning algorithm. The storage 120 may be implemented as a replay memory. For example, the storage 120 may store actions, rewards, etc. that change each time the state transitions, such as d1=[first state (s0), first action (a0), first reward (R0), second state (s1)] or d2= [second state (s1), second action (a1), second reward (R1), third state (s2)] as data.

The storage 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 130 may include an input means for receiving a control command from a user and an output means for outputting an operation state of the apparatus 100 and results thereof. The input means may include a key button, a mouse, a joystick, a jog shuttle, a stylus pen, and the like. Additionally or alternatively, the input means may include a soft key implemented on the display.

The output device may include a display, and may also include a voice output means such as a speaker. In an embodiment, if a touch sensor formed of a touch film, a touch sheet, or a touch pad is provided on the display, the display may operate as a touch screen, and may be implemented in a form in which an input device and an output device are integrated. The display may include at least one of a liquid crystal display (LCD), a thin film transistor liquid crystal display (TFT LCD), an organic light emitting diode display (OLED display), a flexible display, a field emission display (FED), a 3D display, or any combination thereof.

The processor 140 may be electrically connected to the communication device 110, the storage 120, the interface device 130, and the like, and may electrically control each of the communication device 110, the storage 120, the interface device 130, and the like. The processor 140 may be an electrical circuit that executes software commands, thereby performing various data processing and calculations described below.

The processor 140 may process signals transferred between components of the energy efficiency improvement learning apparatus 100, and may perform overall control such that each of the components can perform its function. The processor 140 may be implemented in the form of hardware, software, or a combination of hardware and software. For example, the processor 140 may be implemented as a microprocessor, but the present disclosure is not limited thereto.

The processor 140 may perform learning for vehicle control to minimize vehicle energy consumption required for vehicle driving under random conditions based on a reinforcement learning algorithm, and may provide learned parameters of the reinforcement learning algorithm to the vehicle.

The processor 140 may randomly generate at least one of an entire path from a starting point to a destination, a road shape, a target driving time, an initial vehicle speed, an average target speed, an upper speed limit, a lower speed limit, or any combination thereof, and may start a reinforcement learning episode including a process of a state, an action, and a reward from an initial state to an end state. The action include, for example, motor demand torque, and the reward may include at least one of energy efficiency, a driving time, a speed range, or any combination thereof.

When the reinforcement learning algorithm is executed, the processor 140 may perform a first action $a_0$ according to a first state $s_0$, may determine a first reward $R_0$ according to the first action $a_0$, and may transition to a second state $s_1$.

The processor 140 may learn a policy function for determining what action to take by using at least one piece of data storing a state, an action, a reward, and a new state.

The processor 140 may determine a reward based on a predetermined speed constraint condition, a predetermined time constraint condition, and energy required for driving.

After starting a reinforcement learning episode under random conditions, the processor 140 may compare a driving time during a predetermined learning period with a predetermined time constraint condition.

If the driving time during the predetermined learning period is equal to or greater than the predetermined time constraint condition, the processor 140 may end the reinforcement learning episode. On the other hand, if the driving time during the predetermined learning period is smaller than the predetermined time constraint condition, the processor 140 may calculate the reward based on the vehicle speed.

The processor 140 may determine a reward based on the vehicle speed as a predetermined negative reward if the vehicle speed is lower than a predetermined lower limit or higher than a predetermined upper limit.

If the vehicle speed is lower than a predetermined lower limit for ending learning, or the vehicle speed is higher than a predetermined upper limit for ending learning, the processor 140 may determine a reward based on the vehicle speed as a predetermined maximum negative reward, and may end the reinforcement learning episode.

After ending the reinforcement learning episode, the processor 140 may determine a final reward by i) calculating a reward based on a time and ii) summing the reward based on the vehicle speed and the reward based on the time.

If the vehicle speed is a value between a predetermined lower limit speed for ending learning and a predetermined upper limit speed for ending learning, the processor 140 may determine a weight reward using a predetermined weight and required motor power.

The processor 140 may determine whether the driving distance during a predetermined learning period is smaller than a predetermined target driving distance. If the driving distance during the predetermined learning period is smaller than the predetermined target driving distance, the processor 140 may determine the final reward by summing the reward based on the vehicle speed and the weight reward.

The processor 140 may determine whether the driving distance during the predetermined learning period is smaller than the predetermined target driving distance. If the driving distance during the predetermined learning period is greater than the predetermined target driving distance, the processor 140 may end the reinforcement learning episode and may calculate the time-based reward. The processor 140 may sum the vehicle speed-based reward, the time-based reward, and the weight reward to determine a final reward.

The processor 140 may calculate the time-based reward by using a maximum time constraint reward value, a time factor, and a distance factor.

The processor 140 may linearly assign a weight to a ratio of a target time to an actual driving time, and may exponentially assign a weight to the ratio of the target distance to the actual driving distance.

Referring to FIG. 3, the vehicle control apparatus 200 may include a communication device 210, a storage 220, an interface device 230, and a processor 240.

The communication device 210 may be a hardware device implemented with various electronic circuits. The communication device 210 may be configured to transmit and receive signals through a wireless or wired connection. The communication device 201 may transmit and receive information based on devices in the vehicle 20 and in-vehicle network communication techniques. As an example, the in-vehicle network communication techniques may include controller area network (CAN) communication, local interconnect network (LIN) communication, flex-ray communication, and the like.

In addition, the communication device 210 may perform communication by using the energy efficiency improvement learning apparatus 100, a server, infrastructure, third vehicles outside the vehicle, or the like through a wireless communication technique, such as a wireless Internet access technique, or short range communication technique. The wireless communication technique may include wireless LAN (WLAN), wireless broadband (Wibro), WI-FI, world Interoperability for microwave access (WIMAX), etc. Short-range communication technique may include BLU-ETOOTH, ZIGBEE, ultra wideband (UWB), radio frequency identification (RFID), infrared data association (IrDA), and the like.

As an example, the communication device 210 may receive a learning result from the energy efficiency improvement learning apparatus 100.

The storage 220 may store data and/or algorithms required for the processor 240 to operate, and the like. As an example, the storage 220 may store vehicle state information, a reinforcement learning algorithm, and the like.

The storage 220 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 230 may include an input means for receiving a control command from a user and an output means for outputting an operation state of the apparatus 200 and results thereof. The input means may include a key button, a mouse, a joystick, a jog shuttle, a stylus pen, and the like. Additionally or alternatively, the input means may include a soft key implemented on the display.

The interface device 230 may be implemented as a head-up display (HUD), a cluster, an audio video navigation (AVN), or a human machine interface (HM), a human machine interface (HMI).

The output device may include a display, and may also include a voice output means such as a speaker. In an embodiment, if a touch sensor formed of a touch film, a touch sheet, or a touch pad is provided on the display, the display may operate as a touch screen, and may be implemented in a form in which an input device and an output device are integrated.

The display may include at least one of a liquid crystal display (LCD), a thin film transistor liquid crystal display (TFT LCD), an organic light emitting diode display (OLED display), a flexible display, a field emission display (FED), a 3D display, or any combination thereof.

The processor 240 may be electrically connected to the communication device 210, the storage 220, the interface device 230, and the like, and may electrically control each of the communication device 210, the storage 220, the interface device 230, and the like. The processor 240 may be an electrical circuit that executes software commands, thereby performing various data processing and calculations described below.

The processor 240 may process signals transferred between constituent elements of the vehicle control apparatus 200. The processor 240 may be, e.g., an electronic control unit (ECU), a micro controller unit (MCU), or other subcontrollers mounted in the vehicle.

The processor 240 may determine a vehicle control command by inputting vehicle state information to a reinforcement learning algorithm to which the learned parameters received from the energy efficiency improvement learning apparatus 100 are applied.

The processor 240 may drive the reinforcement learning algorithm using vehicle state information received from the navigation device 400 and vehicle state information predetermined by itself.

The processor 240 may receive a road slope ahead, a virtual destination, etc. from the navigation device 400. The processor 240 may set a target driving distance and a target driving time, calculate an average target speed, and set an upper speed limit, a lower speed limit, and the like.

After starting the reinforcement learning episode, the processor 240 may control the vehicle by selecting an action according to vehicle state information and the policy learned from the energy efficiency improvement learning apparatus 100.

Thereafter, the processor 240 may re-receive the front road scope, the virtual destination, etc. from the navigation device 400. The processor 240 may reset the target driving time to compare the re-received front road slope and virtual destination with the previously received front road slope and virtual destination, respectively. The processor 240 may compare the reset target driving time with a previously set target driving time to determine whether the reinforcement learning episode is ended.

The processor 240 may end the episode if the re-received front road slope and the virtual destination are different from the previously received front road slope and the virtual destination, or if the mileage exceeds the target mileage after the episode starts.

Figure 4:
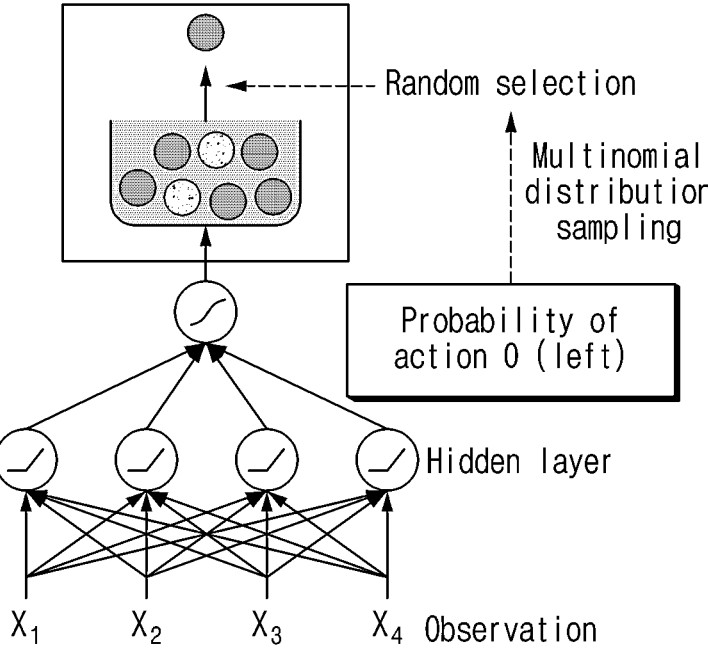
FIG. 4 illustrates a view showing a neural network structure used for learning and improving vehicle energy efficiency, according to an embodiment of the present disclosure.

FIG. 4 illustrates an example view showing a neural network structure for reinforcement learning, according to an embodiment.

FIG. 4 illustrates an example of a neural network as an example of the reinforcement learning network 141.

The reinforcement learning network 141 may determine an action to be performed based on an observed state, and may perform learning to determine an action with the best reward. Parameters of the reinforcement learning network 141 may be learned through learning of the reinforcement learning network 141, and the learned parameters may be set in the reinforcement learning model of the vehicle control apparatus 200.

Figure 5:
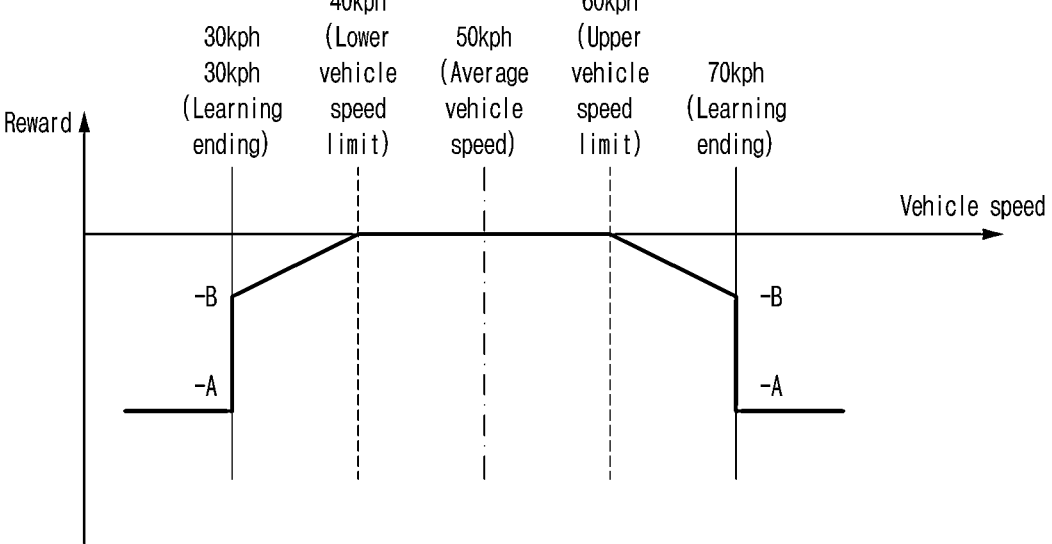
FIG. 5 illustrates a view for describing an example of a speed constraint reward design during learning for improving vehicle energy efficiency, according to an embodiment of the present disclosure.
Figure 6:
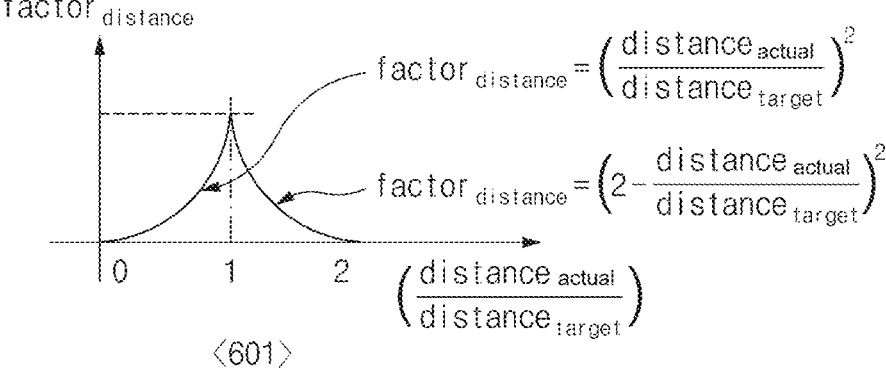
FIG. 6 illustrates a view for describing an example of a time constraint reward design during learning for improving vehicle energy efficiency, according to an embodiment of the present disclosure.
Figure 6:
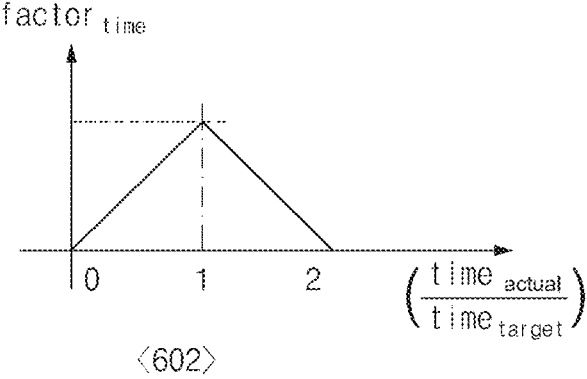

FIG. 5 illustrates a view for describing an example of a speed constraint compensation design during learning for improving vehicle energy efficiency, according to an embodiment. FIG. 6 illustrates a view for describing an example of a time constraint reward design during learning for improving vehicle energy efficiency, according to an embodiment.

In an embodiment, the simulator 142 may set a speed constraint condition and a time constraint condition for reward definition.

The speed constraint condition may indicate a vehicle speed range in which the vehicle speed does not deviate. The time constraint condition may indicate that a time required for driving must satisfy a target time.

The simulator 142 may minimize energy required for a row while satisfying the speed constraint condition and the time constraint condition.

As illustrated in FIG. 5, according to an embodiment of the present disclosure, for a reward design, in addition to the vehicle speed upper limit and vehicle speed lower limit of the constraints, a vehicle speed upper limit for ending learning and a vehicle speed lower limit for ending learning may also be introduced. Accordingly, it may be possible to achieve improved learning stability of reinforcement learning.

In an equation-based control technique including Model Predictive Control (MPC), reinforcement learning is defined in the form of an inequality. On the other hand, in model-free based reinforcement learning, rewards may be designed to reflect this.

If an agent does not satisfy constraint conditions of the environment (e.g., a robot trips over while walking, or drops while carrying an object), the reinforcement learning may teach the agent that this situation is undesirable by ending learning and returning a very large negative (−) reward to the agent.

In this case, the agent may be punished, e.g., by the very large negative (−) reward. As a result, it may not want to take actions that lead to a state close to this situation. However, in attempting an action approaching this situation, maximally utilizing a vehicle speed range of the constraint condition and maximizing the vehicle speed during downhill driving, potential energy may be converted into kinetic energy. The vehicle speed may thus be lowered as much as possible to find an optimal action to minimize electrical energy consumption during uphill driving, and if the vehicle speed exceeds the lower limit and the upper vehicle speed limit, if a very large negative (−) reward is given, such an optimal strategy may not be learned.

In order to overcome this problem, the simulator 142 may not punish if the vehicle speed is within a predetermined range of a speed constraint condition. Further, the simulator 140 may impose a weak penalty in proportion to a degree to which it deviates from the speed constraint if the vehicle speed is out of range and the vehicle speed is not reached, and may impose very heavy punishment and end the learning if the vehicle speed for ending learning is reached.

Referring to FIG. 5, the simulator 142 may set an average vehicle speed of 50 kph and a speed constraint in the range of 40 to 60 kph. The simulator 142 may impose punishment of negative (−) B (e.g., −10) if the vehicle speed for ending learning is set to 30 kph or 70 kph and the vehicle speed is between the upper limit value or the lower limit value and the vehicle speed for ending learning. Further, the simulator 142 may impose punishment of negative (−) A (e.g., −100) as a very large penalty if it is out of the vehicle speed for ending learning.

Accordingly, the simulator 142 may be configured to give negative (−) reward when the vehicle speed deviates from the speed constraint condition.

In addition, the reinforcement learning may aim to minimize energy consumption while driving a same distance equal to a time required for constant speed driving, and thus rewards may be designed to reflect this aim.

A time constraint reward may include three terms: a weight, a distance factor ($factor_{distanc}$), and a time factor ($factor_{time}$). The weight may adjust a proportion of a time constraint reward to an energy efficiency reward.

The simulator 142 may determine whether the distance is satisfied after an elapse of the target time and may determine whether the time is satisfied after driving the target distance. These two cases may be repeated in a learning process.

Referring to FIG. 6, a vertical axis in a graph 601 indicates the distance factor, and a horizontal axis indicates a value obtained by dividing an actual distance ($distance_{actual}$) by a target distance ($distance_{target}$)

In a graph 602, a vertical axis indicates a time factor, and a horizontal axis indicates a value obtained by dividing an actual time ($time_{actual}$) by a target time ($time_{target}$).

As can be seen in the graph 602, a time was learned stably if a weight is linearly given for a ratio of an actual driving time to the target time. As can be seen in the graph 601, a distance was learned stably if a weight is given exponentially (sensitively) around the target distance.

A reward by time ($R_{time}$) may be calculated using a maximum time constraint reward ($w_{time}$), the distance factor ($factor_{distance}$), and the time factor ($factor_{time}$), as shown in Equation 4 below.

$$R_{time} = w_{time} \cdot factor_{distance} \cdot factor_{time} \qquad \text{Equation 4}$$

The maximum time constraint reward ($w_{time}$) may be determined as a value between 0 and 25. The maximum time constraint reward ($w_{time}$) may be predetermined by an experimental value, for example. The distance factor ($factor_{distance}$) and the time factor ($factor_{time}$) may be a value between 0 and 1.

In an embodiment, if the target distance is 1 as in the graph 601, a weight is assigned to a left side of the target distance as shown in Equation 5 below and a weight is assigned to a right side of the target distance as shown in Equation 6 below.

$$factor_{distance} = \left( \frac{distance_{actual}}{distance_{target}} \right)^2 \qquad \text{Equation 5}$$

$$factor_{distance} = \left( 2 - \frac{distance_{actual}}{distance_{target}} \right)^2 \qquad \text{Equation 6}$$

Figure 7:
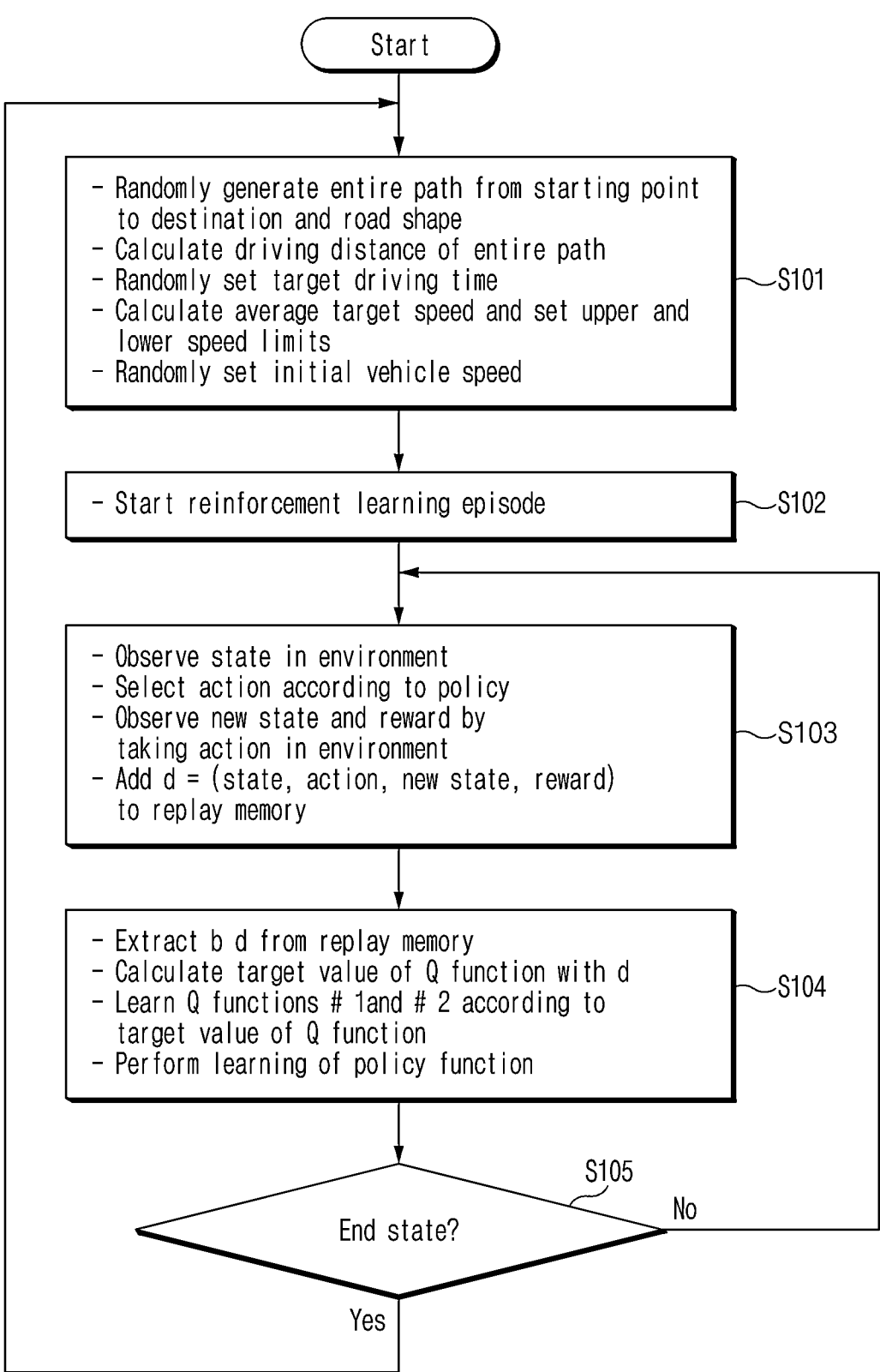
FIG. 7 is a flowchart describing a learning method for improving electrical energy efficiency of an energy efficiency improvement learning apparatus, according to an embodiment of the present disclosure.
Figure 8:
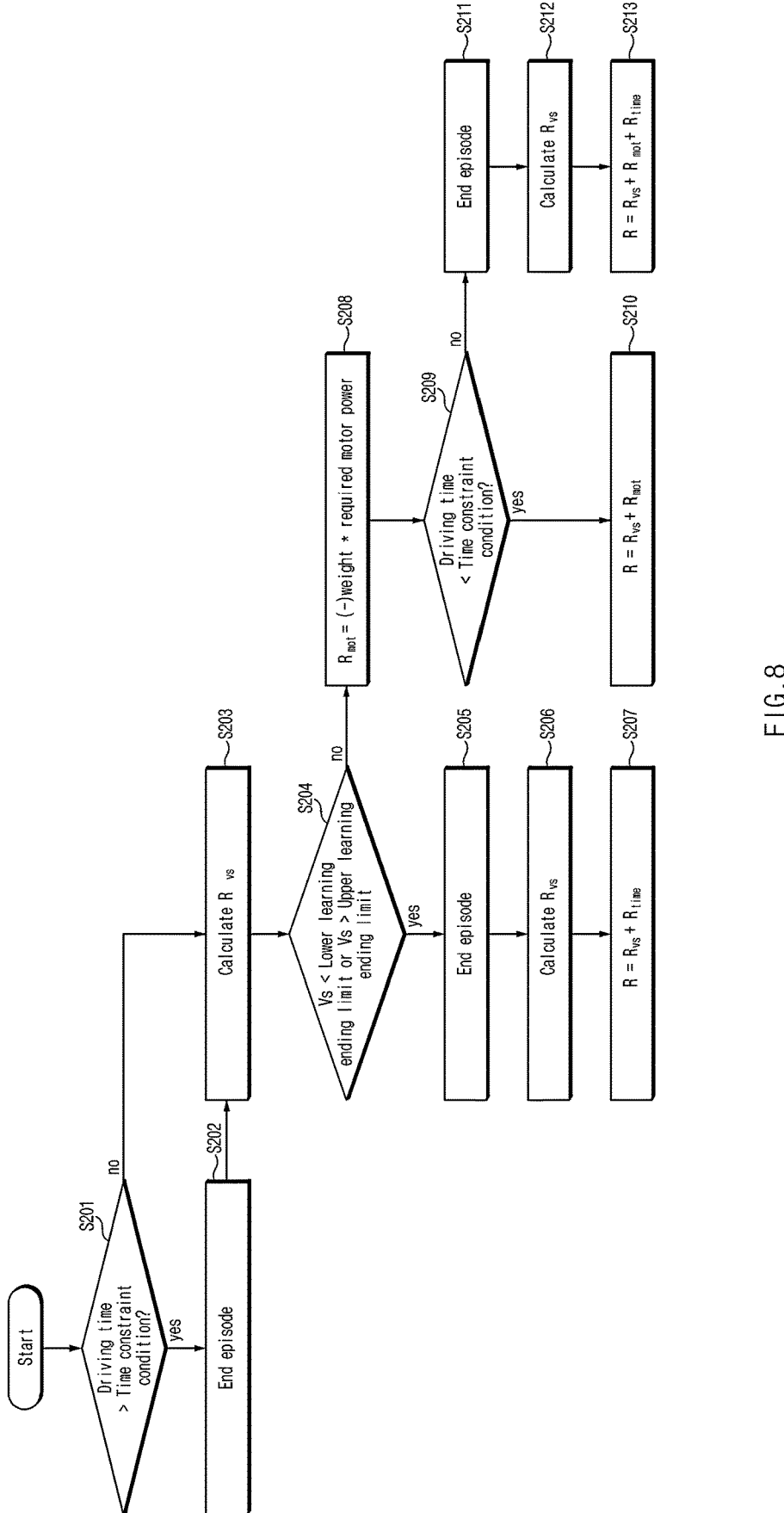
FIG. 8 is a flowchart illustrating a learning method for improving electrical energy efficiency of an energy efficiency improvement learning apparatus, according to an embodiment of the present disclosure.

Hereinafter, a vehicle electrical energy efficiency improvement method of an energy efficiency improvement learning apparatus according to an embodiment of the present disclosure is described in detail with reference to FIG. 7 and FIG. 8. FIG. 7 illustrates a flowchart for describing an example learning method for improving electrical energy efficiency of an energy efficiency improvement learning apparatus, according to an embodiment. FIG. 8 illustrates a flowchart for describing an example learning method for improving electrical energy efficiency of an energy efficiency improvement learning apparatus, according to an embodiment.

Hereinafter, it is assumed that the energy efficiency improvement learning apparatus 100 of FIG. 1 performs the processes of FIG. 7 and FIG. 8. In addition, in the description of FIG. 7 and FIG. 8, operations described as being performed by the device may be controlled by the processor 140 of the energy efficiency improvement learning apparatus 100.

Referring to FIG. 7, in an operation S101, the energy efficiency improvement learning apparatus 100 may set random conditions.

The random conditions may include an entire path, a road shape, a driving distance of the entire path, a target driving time, an average target speed, upper and lower speed limits, an initial vehicle speed, etc.

For example, the energy consumption improvement learning apparatus 100 may randomly generate the entire path from a starting point to a destination and the road shape. As another example, the energy efficiency improvement learning apparatus 100 may calculate the driving distance of the entire path, and may randomly set the target driving time. The energy efficiency improvement learning apparatus 100 may calculate the average target speed, and may set the upper and lower speed limits. Further, the energy efficiency improvement learning apparatus 100 may randomly set the initial speed of the vehicle.

In an operation S102, the energy efficiency improvement learning apparatus 100 may start a reinforcement learning episode based on the randomly set random condition. The reinforcement learning episode may include a series of a state, an action, and a reward that an agent goes through from an initial state $s_0$ to an end state, and may include, e.g., a learning period and a daily routine. For example, if one day is set as the learning period and the daily routine is determined to be 1200 m or 10 min of driving, the energy efficiency improvement learning apparatus 100 may for 1200 m or 10 min during the day under the random condition set in step S101.

In an operation S103, the energy efficiency improvement learning apparatus 100 may observe a state in an environment, may select an action according to a policy, and may observe a new state and a reward by taking an action in the environment.

The energy efficiency improvement learning apparatus 100 may add d=[state, action, new state, reward] to storage 120 (e.g., replay memory).

In an operation S104, the energy efficiency improvement learning apparatus 100 may extract b d=[state, action, new state, reward] from storage 120 (S104). For example, if b is 100, to-do is learned considering 100 situations.

The energy efficiency improvement learning apparatus 100 may calculate a target value of a Q function with d, and may learn Q functions #1 and #2 according to the target value of the Q function. The target value of the Q function may indicate a function that can know whether it is optimal or not, and may learn the Q functions #1 and #2 to satisfy the target value. The Q function may indicate a normal Q function used in reinforcement learning.

The energy efficiency improvement learning apparatus 100 may perform learning of a policy function. The policy function is a function that determines what action to take.

In an operation S105, the energy efficiency improvement learning apparatus 100 may determine whether a reinforcement learning episode has ended. If the reinforcement learning episode has ended, the energy efficiency improvement learning apparatus 100 may return to the operation S101 and repeatedly may perform operations S101-S105 until it is determined that the reinforcement learning episode has ended. The energy efficiency improvement learning apparatus 100 may determine whether the reinforcement learning episode has ended by determining whether the learning period has ended. In this case, an end state of the reinforcement learning corresponds to a state in which an agent cannot take further actions.

In an embodiment, the simulator 142 may perform a speed-constraint reward design and a time-constraint reward design.

The speed-constraint reward design and the time-constraint reward design, according to embodiments, are described in detail with reference to FIG. 8.

Referring to FIG. 8, in an operation S201, the energy efficiency improvement learning apparatus 100 may determine whether the driving time is greater than a predetermined time constraint condition. The time constraint condition may be 86.5 s, for example.

In an operation S202, if the driving time satisfies a time constraint, the energy efficiency improvement learning apparatus 100 may end the reinforcement learning episode.

In an operation S203, if the driving time does not satisfy the time constraint, the energy efficiency improvement learning apparatus 100 may calculate a vehicle speed-based reward $R_{vs}$.

In an operation S204, the energy efficiency improvement learning apparatus 100 may determine whether the vehicle speed Vs is smaller than a lower learning ending limit and whether the vehicle speed Vs is greater than an upper learning ending limit.

In an operation S205, if the vehicle speed Vs is smaller than the lower learning ending limit or is greater than the upper learning ending limit, the energy efficiency improvement learning apparatus 100 may end the episode. Accordingly, the energy efficiency improvement learning apparatus 100 may end the episode if the vehicle speed deviates from the lower or upper learning ending limit.

In an operation S206, the energy efficiency improvement learning apparatus 100 may calculate a time-based reward $R_{time}$.

In an operation S207, the energy efficiency improvement learning apparatus 100 may calculate a final reward R by summing both the vehicle speed-based reward $R_{vs}$ and the time-based reward $R_{time}$.

Referring again to the operation S204, if the vehicle speed Vs is equal to or greater than the lower learning ending limit and the vehicle speed Vs is equal to or smaller than the upper learning ending limit, the energy efficiency improvement learning apparatus 100 may calculate a weight reward $R_{mot}$ in an operation S208. The weight reward $R_{mot}$ may be calculated by multiplying a negative (–) weight by required motor power.

The energy efficiency improvement learning apparatus 100 may thus add an importance weight, The weight may be predetermined by an experimental value, for example. The energy efficiency improvement learning apparatus 100 may increase the weight if energy reduction is more important than time and may decrease the weight if time is more important than energy reduction, for example.

In an operation S209, the energy efficiency improvement learning apparatus 100 may determine whether the driving distance is smaller than the target driving distance. If the mileage is smaller than the target mileage, the energy efficiency improvement learning apparatus 100 may calculate a final reward R by summing the vehicle speed-based reward $R_{vs}$ and the weight reward $R_{mot}$ (S210). In this case, because the episode has not yet ended, it may be possible to return to the operation S201 and to perform a reward process for a next period in order to continue the episode.

Referring again to the operation S209, if the driving distance is equal to or greater than the target driving distance in step, the energy efficiency improvement learning apparatus 100 may end the episode in an operation S211.

In an operation S212, the energy efficiency improvement learning apparatus 100 may calculate the time-based reward $R_{time}$.

In an operation S213, the energy efficiency improvement learning apparatus 100 may calculate the final reward R by summing the vehicle speed-based reward $R_{vs}$, the weight reward $R_{mot}$, and the time-based reward $R_{time}$.

Figure 9:
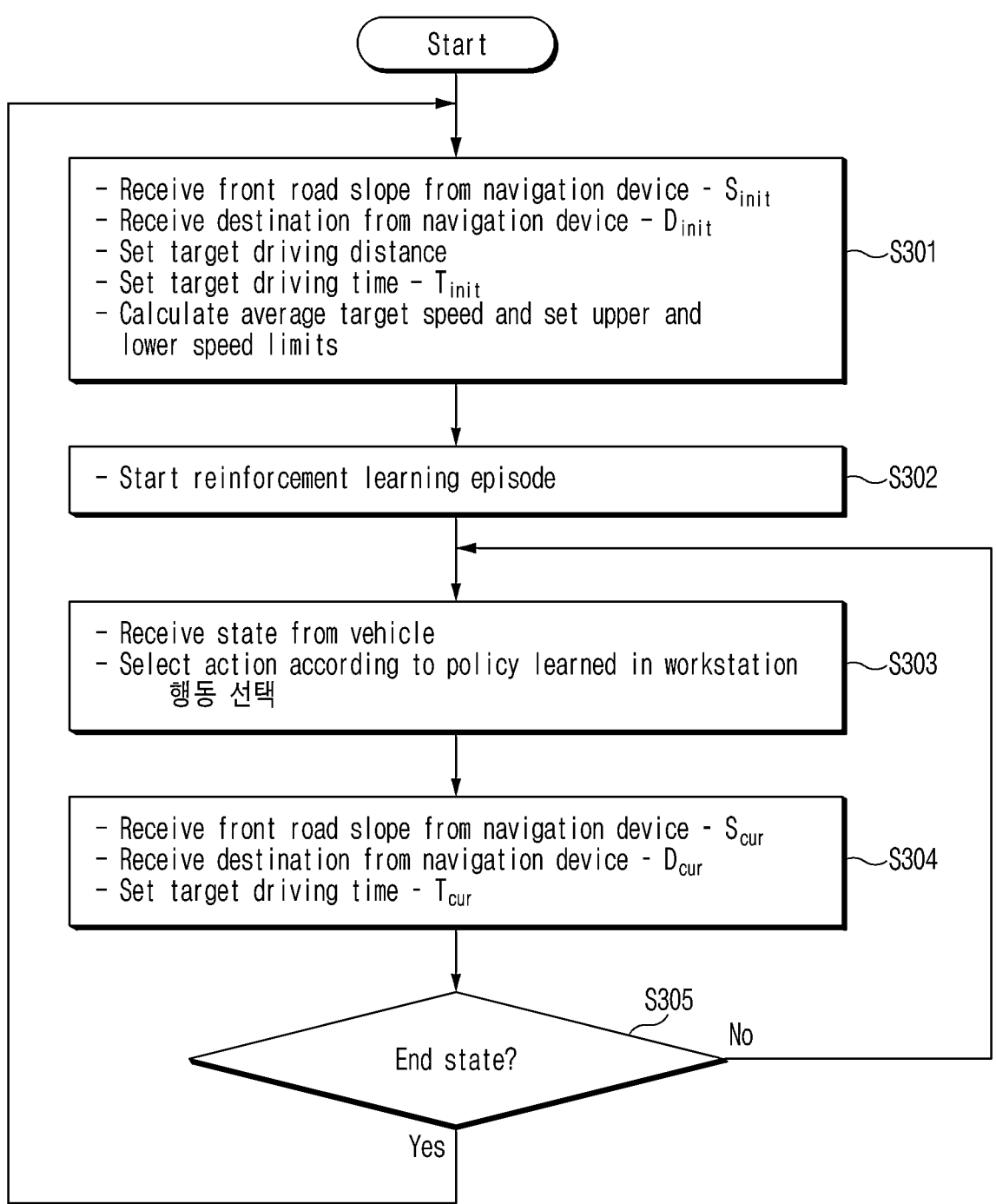
FIG. 9 is a flowchart illustrating a control method for improving vehicle energy efficiency of a vehicle control apparatus, according to an embodiment of the present disclosure.

Hereinafter, a vehicle electrical energy efficiency improvement method of a vehicle control apparatus according to an embodiment of the present disclosure is described in detail with reference to FIG. 9. FIG. 9 illustrates a flowchart for describing a control method for improving vehicle energy efficiency of a vehicle control apparatus, according to an embodiment.

Hereinafter, it is assumed that the vehicle control apparatus 200 of the of FIG. 1 performs processes of FIG. 9. In addition, in the description of FIG. 9, operations described as being performed by a device may be controlled by the processor 240 of the vehicle control apparatus 200, in an embodiment.

A reinforcement learning-based algorithm learned by the energy efficiency improvement learning apparatus 100 may be installed in the vehicle control apparatus 200. The vehicle control apparatus 200 may execute the reinforcement learning-based algorithm to determine a command for controlling the vehicle by using vehicle driving information as an input of the reinforcement learning-based algorithm.

Referring to FIG. 9, in an operation S301, the vehicle control apparatus 200 may receive a front road slope Sinit and a virtual destination Dinit from the navigation device 400, may set a target driving distance (e.g. 1200 m) and a target driving time (e.g. 60 s) Tinit, and may calculate an average target speed and set an upper speed limit and a lower speed limit.

In an operation S302, the integrated control apparatus 200 may start the reinforcement learning episode.

In an operation S303, the vehicle control apparatus 200 may collect vehicle state information, and may select an action according to the policy learned in the energy efficiency improvement learning apparatus 100.

In an operation S304, the vehicle control apparatus 200 may receive a current front road slope Scur and a virtual destination Dour from the navigation device 400, and may set a target driving time Tour.

In an operation S305, the vehicle control apparatus 200 may determine whether a learning period of the reinforcement learning episode has ended. In an embodiment, if one or more of i) an initial virtual destination Dinit received in the operation S301 and the current virtual destination Dcur received in the operation S304 are different, ii) an initial target driving time Tinit set in operation S301 and a current target driving time Tour set in the operation S304 are different, and/or iii) at least one of the cases in which a mileage exceeds the target mileage set in the operation S301 after the start of the reinforcement learning episode is satisfied, the vehicle control apparatus 200 may determine that the reinforcement learning episode has ended.

As such, according to embodiments of the present disclosure, in a vehicle driving at a constant speed (e.g., 50 KPH) for a target distance (e.g., 1200 m) on a road including uphill and downhill, it may be possible to improve energy efficiency by up to 20% or more. In addition, according to embodiments the present disclosure, even if an initial condition changes, a road environment changes, or a vehicle weight changes, there may be almost no performance degradation due to learning a motor control strategy for driving that minimizes electrical energy usage in randomly given roads and driving conditions.

In addition, according to embodiments of the present disclosure, the vehicle control apparatus 200 with low computational performance may learn the driving strategy with a neural network size (parameters=3073) that can be inferred within a control period (e.g., 10 ms), and thus no additional cost is incurred.

Figure 10:
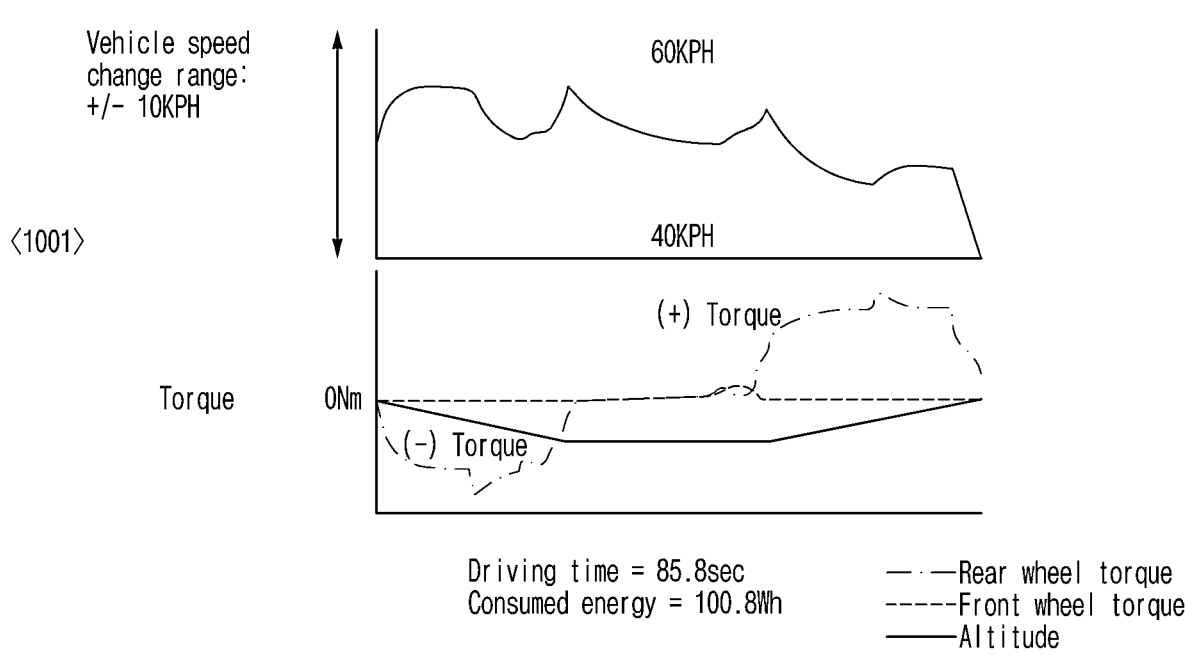
FIG. 10 illustrates an example learning result for improving vehicle energy efficiency, according to an embodiment of the present disclosure.
Figure 10:
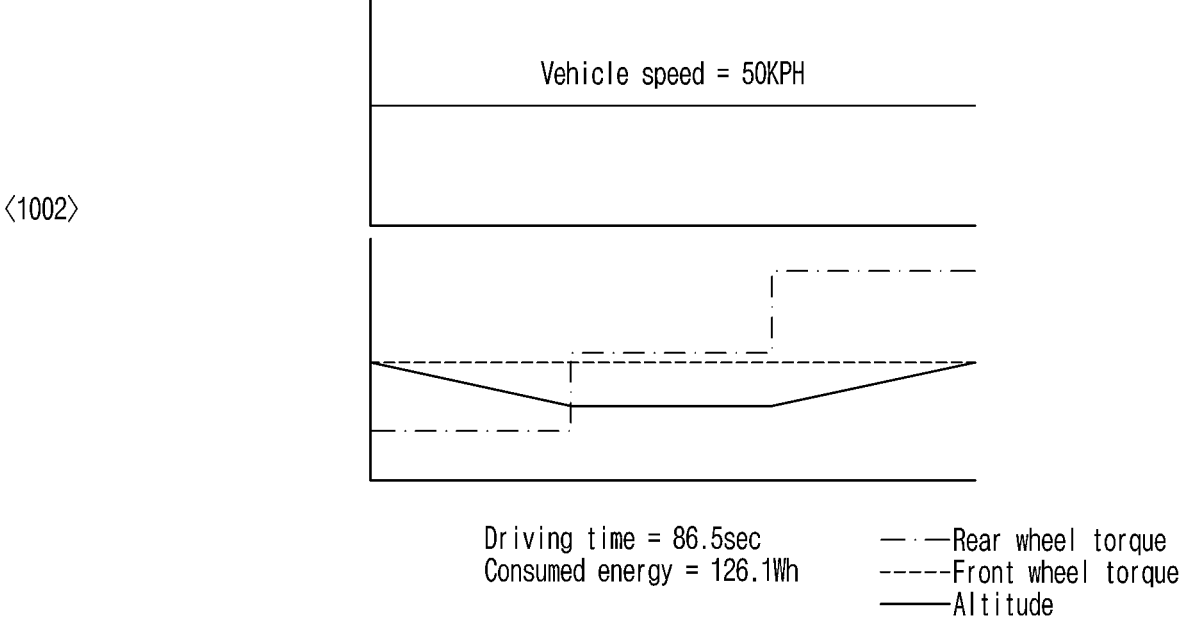

FIG. 10 illustrates an example learning result for improving vehicle energy efficiency, according to an embodiment.

Referring to FIG. 10, a graph 1001 represents a vehicle speed, torque, and a road shape. In the example depicted in the graph 1001, the consumed energy is 100.8 watt hours (Wh) as a control result of the reinforcement learning that is learned when a road of 400 m downhill with a 10% slope, 400 m on a flat ground, and 400 m uphill with a 10% slope, i.e., a road with a total length of 1200 m is set as a target time of 86.5 s.

A graph 1002 represents the vehicle speed, torque, and the road shape in a vehicle driving at a constant speed (e.g., 50 kph) if a road with a total length of 1200 m is set as a target time of 86.5 s, 400 m downhill at a 10% slope, 400 m flat, and 400 m uphill at a 10% slope. In the example depicted in the graph 1002, the consumed energy is 126.1 Wh.

In the case of the driving strategy through reinforcement learning of the graph 1001, it may be seen that it uses 20% less energy than the energy consumed for constant speed driving at a same time as in the graph 1002 while satisfying both the speed (within 40 to 60 KPH) and time constraints (86.5 s or less).

FIG. 11-FIG. 14 each illustrates an example of a learning control strategy in a random learning condition, in accordance with an embodiment.

Figure 11:
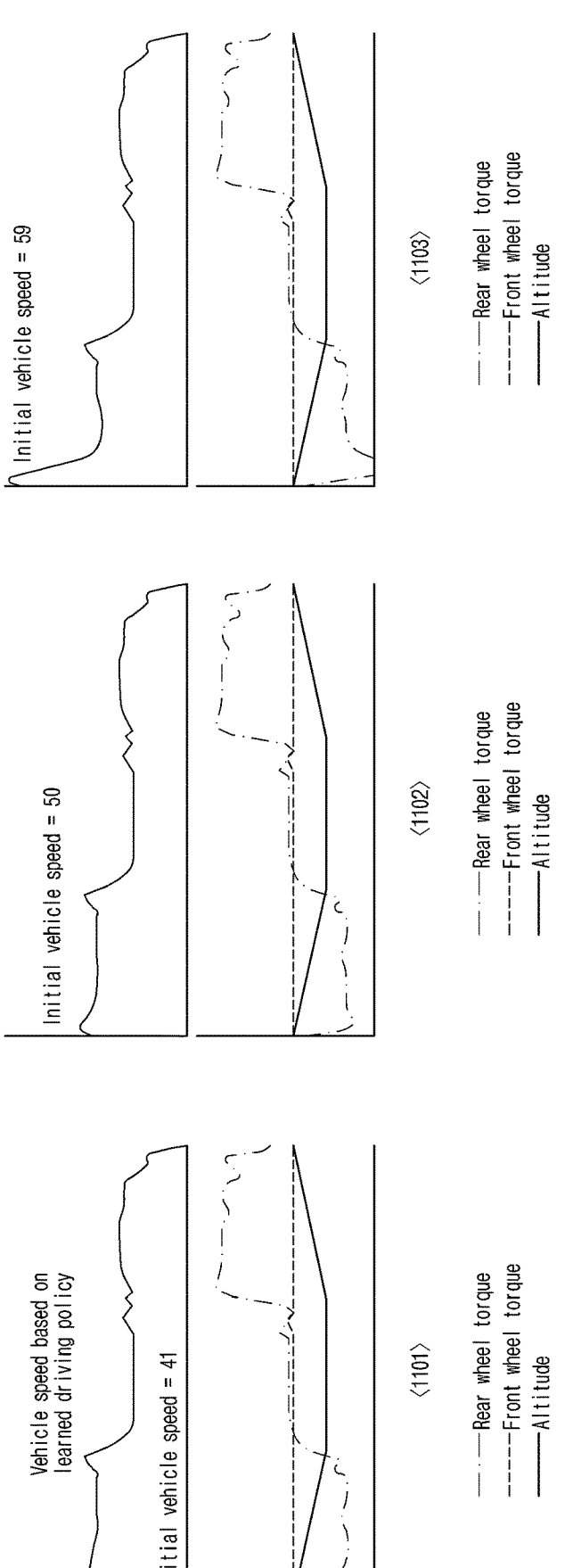
FIG. 11-FIG. 14 each illustrates an example of a learning control strategy in a random learning condition, according to an embodiment of the present disclosure.

FIG. 11 illustrates an example of a reinforcement learning result in which an initial speed is randomly set, for example, if it is desired to travel 100 km in 2 hours. A target time may be set under various vehicle speed conditions, and a control strategy may be learned for various initial vehicle speeds rather than a specific initial vehicle speed.

FIG. 11 illustrates examples of a vehicle speed 1101, a torque 1102, and a road shape 1103 as learning results in which various initial speeds are set.

Figure 12:
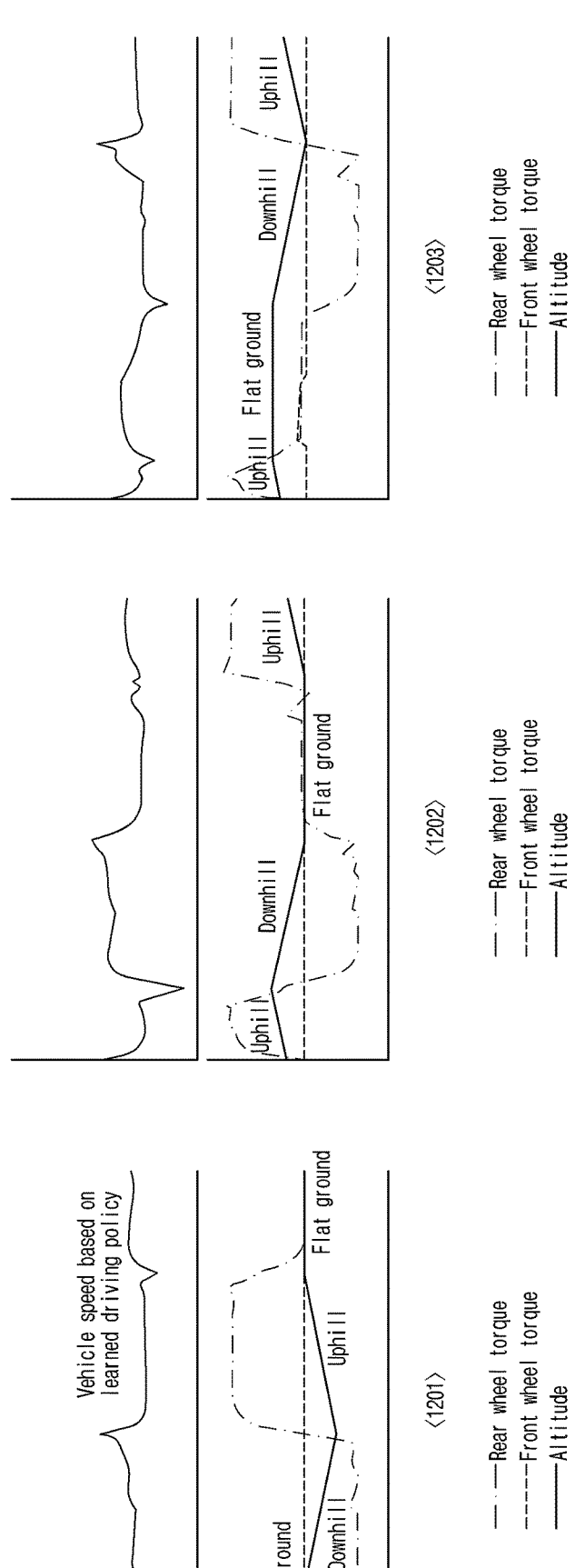

FIG. 12 illustrates an example of a reinforcement learning result in which a road pattern is randomly set, and a vehicle speed 1201, a torque 1202, and a road shape 1203 are results of pre-learning on various road patterns by randomly setting road patterns.

As such, according to embodiments of the present disclosure, it may be possible to establish a driving strategy that can respond immediately on an actual road by pre-learning about various road patterns.

Figure 13:
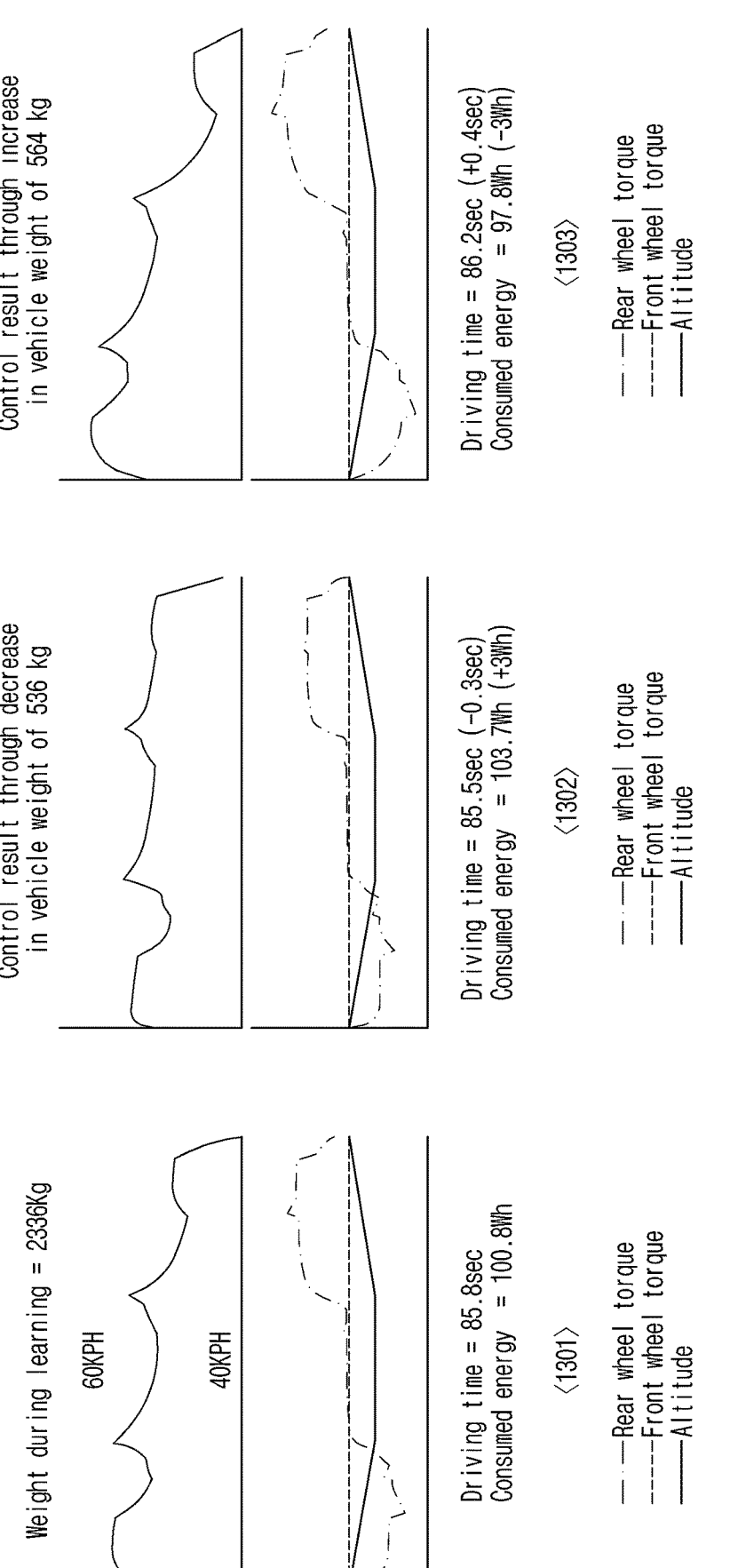

FIG. 13 illustrates an example of a reinforcement learning result in which a vehicle weight is randomly set, and reference numerals 1301, 1302, and 1303 are examples of a vehicle speed, torque, and a road shape as learning results in which the vehicle weights are 2363 kg, 536 kg, and 564 kg, respectively.

Figure 14:
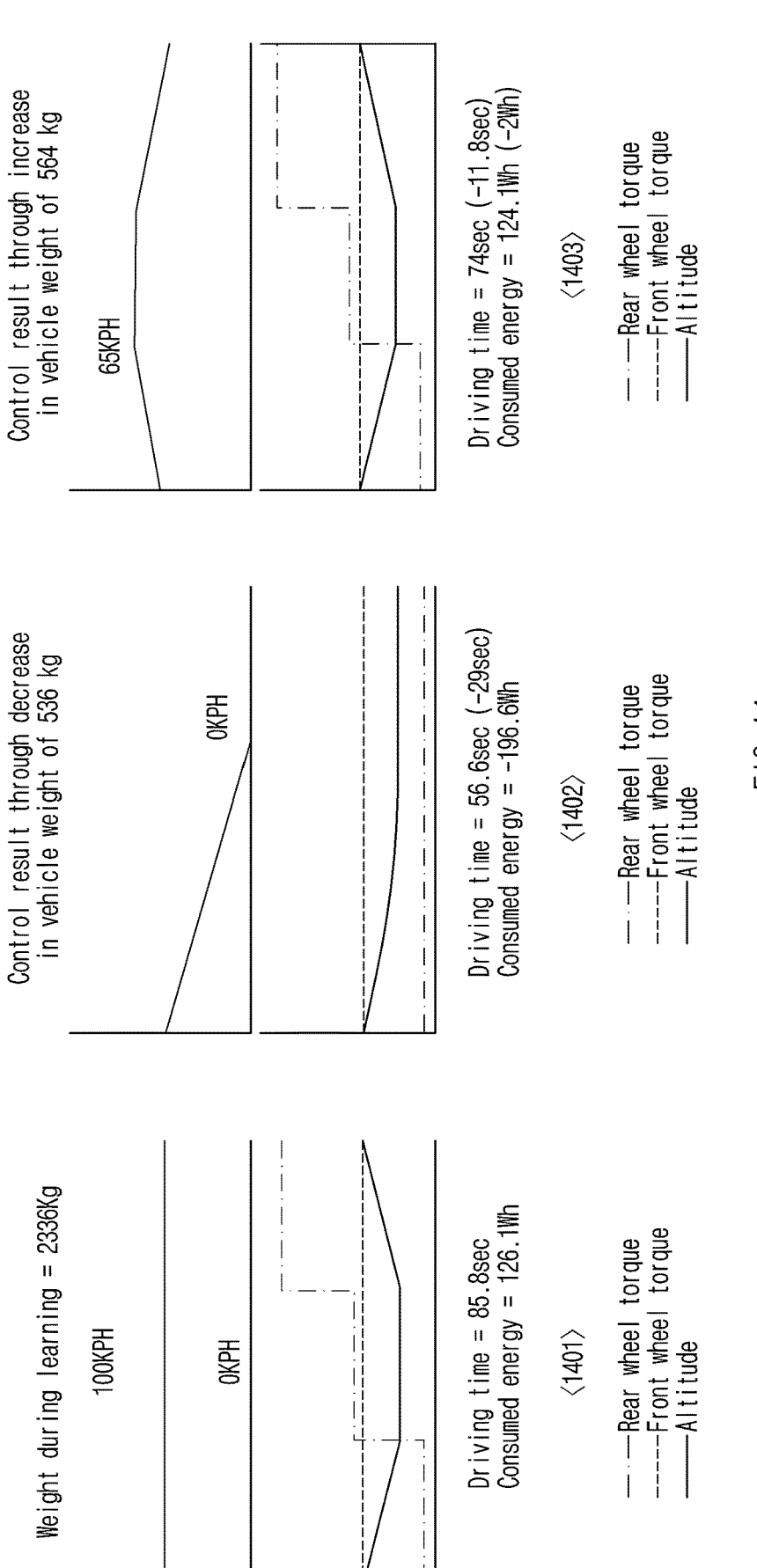

FIG. 14 illustrates an example of a result in which the vehicle weight is randomly set and constant speed driving is performed, graphs 1401, 1402, and 1403 depict examples in which vehicle weights are 2363 kg, 536 kg, and 564 kg, respectively.

Referring to FIG. 13 and FIG. 14, the graph 1301 shows that the consumed energy is 100.8 Wh and the graph 1401 shows that the consumed energy is 126.1 Wh, and it may be seen that energy consumption is less during driving by reinforcement learning than during driving at a constant speed.

The graph 1302 shows that the consumed energy is 103.7 (+3) Wh and the graph 1402 shows that the consumed energy is −196.6 Wh, and it may be seen that energy consumption is less during driving by reinforcement learning than during driving at a constant speed.

The graph 1303 shows that the consumed energy is 97.8 (−3) Wh and the graph 1403 shows that the consumed energy is 124.1 (−2) Wh, and it may be seen that energy consumption is less during driving by reinforcement learning than during driving at a constant speed.

Comparing the reinforcement learning result and the constant speed driving result under various random conditions as illustrated in FIG. 11-FIG. 14, it may be seen that electrical energy efficiency is further improved during reinforcement learning.

As such, according to embodiments the present disclosure, a torque value for vehicle control may be inferred through a reinforcement learning algorithm to which the parameters learned in the vehicle control apparatus 200 are applied by performing reinforcement learning on the workstation and applying the learned parameters to the vehicle. In this case, the vehicle control apparatus 200 may not greatly increase an inference time by applying the already learned parameters.

Figure 15:
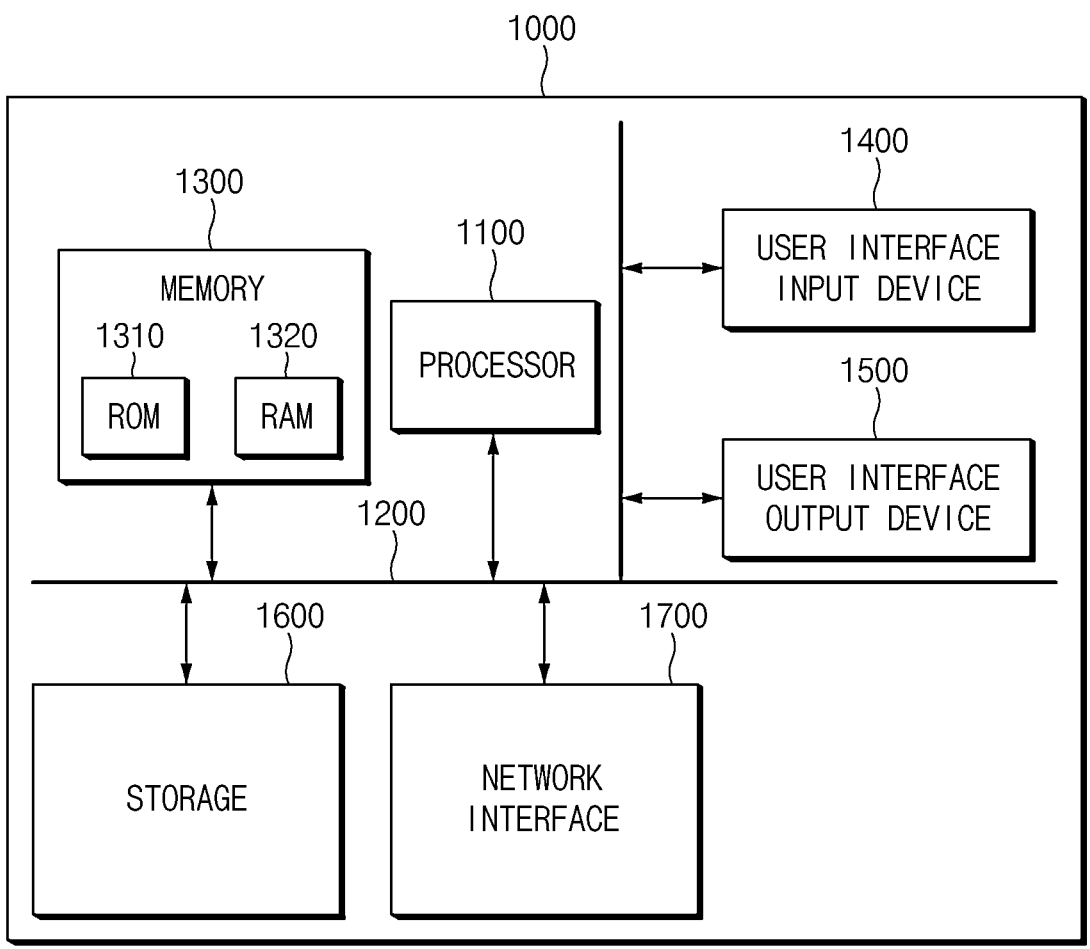
FIG. 15 illustrates a computing system, according to an embodiment of the present disclosure.

FIG. 15 illustrates a computing system, according to an embodiment.

Referring to FIG. 15, a computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

In various embodiments, operations of methods or algorithms described herein may be directly implemented by hardware, a software module executed by the processor 1100, or a combination of thereof. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

The storage medium may be coupled to the processor 1100. The processor 1100 may read information from and write information to the storage medium. Alternatively, the storage medium may be at least partially integrated with the processor 1100. The processor and the storage medium may reside within an application specific integrated circuit (ASIC). The ASIC may reside within a user terminal. As another example, the processor and the storage medium may reside as separate components within the user terminal.

The above description is merely illustrative of the technical idea of the present disclosure, and those having ordinary skill in the art to which the present disclosure pertains may make various modifications and variations without departing from the essential characteristics of the present disclosure.

The example embodiments disclosed in the present disclosure are not Intended to limit the technical ideas of the present disclosure, but to explain them. The scope of the technical ideas of the present disclosure is not limited by these example embodiments. The protection range of the present disclosure should be interpreted by the claims below, and all technical ideas within the equivalent range should be interpreted as being included in the scope of the present disclosure.

What is claimed is:

1. An energy efficiency improvement learning apparatus comprising:

a processor configured to:

perform real-time reinforcement learning for motor torque control of a vehicle to minimize vehicle energy consumption required for vehicle driving under random conditions based on a reinforcement learning algorithm, and provide learned parameters of the real-time reinforcement learning algorithm to the vehicle, wherein the processor is configured to:

end a reinforcement learning episode when a driving time during a predetermined learning period is greater than a predetermined time constraint condition, and calculate a reward based on a vehicle speed when the driving time during the predetermined learning period is smaller than the predetermined time constraint condition; and a storage medium configured to store data and algorithms, wherein the storage medium is configured to store the reinforcement learning algorithm executable by the processor.

2. The energy efficiency improvement learning apparatus of claim 1, wherein the processor is configured to:

randomly generate at least one of an entire path from a starting point to a destination, a road shape, a target driving time, an initial vehicle speed, an average target speed, an upper speed limit, a lower speed limit, or any combination thereof, and start the reinforcement learning episode including a process of a state, an action, and a reward from an initial state to an end state.

3. The energy efficiency improvement learning apparatus of claim 2, wherein the action includes motor demand torque.

4. The energy efficiency improvement learning apparatus of claim 2, wherein the reward includes at least one of energy efficiency, a driving time, or a speed range.

5. The energy efficiency improvement learning apparatus of claim 1, wherein the processor is configured to:

perform a first action according to a first state, determine a first reward according to the first action, and transition to a second state when the reinforcement learning algorithm is executed.

6. The energy efficiency improvement learning apparatus of claim 5, wherein the storage medium is configured to store the first state, the first action, the first reward, and the second state as first data.

7. The energy efficiency improvement learning apparatus of claim 6, wherein the processor is configured to learn a policy function for determining what action to take by using at least one piece of data storing a state, an action, a reward, and a new state.

8. The energy efficiency improvement learning apparatus of claim 1, wherein the processor is configured to determine a reward based on a predetermined speed constraint condition, a predetermined time constraint condition, and energy required for driving.

9. The energy efficiency improvement learning apparatus of claim 1, wherein the processor is configured to, after starting the reinforcement learning episode under the random conditions, compare the driving time during the predetermined learning period with the predetermined time constraint condition.

10. The energy efficiency improvement learning apparatus of claim 1, wherein the processor is configured to determine the reward based on the vehicle speed as a predetermined negative reward if the vehicle speed is lower than a predetermined lower limit or higher than a predetermined upper limit.

11. The energy efficiency improvement learning apparatus of claim 1, wherein the processor is configured to:

when the vehicle speed is lower than a predetermined lower limit for ending learning or is higher than a predetermined upper limit for ending learning:

determine the reward based on the vehicle speed as a predetermined maximum negative reward, and end the reinforcement learning episode.

12. The energy efficiency improvement learning apparatus of claim 11, wherein the processor is configured to, after ending the reinforcement learning episode, determine a final reward by calculating a reward based on a time and summing the reward based on the vehicle speed and the reward based on the time.

13. The energy efficiency improvement learning apparatus of claim 1, wherein the processor is configured to, when the vehicle speed is a value between a predetermined lower limit speed for ending learning and a predetermined upper limit speed for ending learning, determine a weight reward using a predetermined weight and required motor power.

14. The energy efficiency improvement learning apparatus of claim 13, wherein the processor is configured to:

determine whether a driving distance during the predetermined learning period is smaller than a predetermined target driving distance, and when the driving distance during the predetermined learning period is smaller than the predetermined target driving distance, determine a final reward by summing the reward based on the vehicle speed and the weight reward.

15. The energy efficiency improvement learning apparatus of claim 13, wherein the processor is configured to:

determine whether a driving distance during the predetermined learning period is smaller than a predetermined target driving distance, and when the driving distance during the predetermined learning period is equal to or greater than the predetermined target driving distance:

end the reinforcement learning episode, calculate a time-based reward, and sum a vehicle speed-based reward, the time-based reward, and the weight reward to determine a final reward.

16. The energy efficiency improvement learning apparatus of claim 15, wherein the processor is configured to calculate the time-based reward by using a maximum time constraint reward value, a time factor, and a distance factor.

17. The energy efficiency improvement learning apparatus of claim 13, wherein the processor is configured to:

linearly assign a weight to a ratio of a target time to an actual driving time, and exponentially assign a weight to the ratio of a target distance to the actual driving distance.

18. An energy efficiency improvement system, comprising:

an energy efficiency improvement learning apparatus configured to:

perform real-time reinforcement learning for motor torque control of a vehicle to minimize vehicle energy consumption required for vehicle driving under random conditions based on a reinforcement learning algorithm, and provide learned parameters of the reinforcement learning algorithm to the vehicle, wherein the energy efficiency improvement learning apparatus is configured to:

end a reinforcement learning episode when a driving time during a predetermined learning period is greater than a predetermined time constraint condition, and calculate a reward based on a vehicle speed when the driving time during the predetermined learning period is smaller than the predetermined time constraint condition; and a vehicle control apparatus configured to determine a command for motor torque control of the vehicle by inputting vehicle state information to the reinforcement learning algorithm to which learned parameters received from the energy efficiency improvement learning apparatus are applied.

19. An electrical energy efficiency improvement method for a vehicle, comprising:

performing, by a processor, real-time reinforcement learning for motor torque control of a vehicle to minimize vehicle energy consumption required for vehicle driving under random conditions based on a reinforcement learning algorithm, wherein performing real-time reinforcement learning includes i) ending a reinforcement learning episode when a driving time during a predetermined learning period is greater than or equal to a predetermined time constraint condition, and ii) calculating a reward based on a vehicle speed when the driving time during the predetermined learning period is smaller than the predetermined time constraint condition; and providing, by the processor, learned parameters of the reinforcement learning algorithm to the vehicle.

* * * * *